March 21, 1939.  C. LUDWIG  2,151,480

AUTOMATIC KNIFE BLADE GRINDING MACHINE

Filed May 14, 1937  6 Sheets-Sheet 1

Fig. 1.

INVENTOR.
Clarence Ludwig
BY
H. G. Burns ATTORNEY.

March 21, 1939. C. LUDWIG 2,151,480
AUTOMATIC KNIFE BLADE GRINDING MACHINE
Filed May 14, 1937 6 Sheets-Sheet 2

INVENTOR.
Clarence Ludwig
BY
W. G. Burns ATTORNEY.

March 21, 1939.   C. LUDWIG   2,151,480
AUTOMATIC KNIFE BLADE GRINDING MACHINE
Filed May 14, 1937   6 Sheets-Sheet 3

INVENTOR.
Clarence Ludwig
BY
W. G. Burns ATTORNEY.

March 21, 1939.  C. LUDWIG  2,151,480

AUTOMATIC KNIFE BLADE GRINDING MACHINE

Filed May 14, 1937  6 Sheets-Sheet 4

INVENTOR.
Clarence Ludwig
BY
A. G. Burns
ATTORNEY.

March 21, 1939.                C. LUDWIG                    2,151,480
              AUTOMATIC KNIFE BLADE GRINDING MACHINE
                   Filed May 14, 1937        6 Sheets-Sheet 5

INVENTOR.
Clarence Ludwig.
BY
H. G. Burns    ATTORNEY.

March 21, 1939.　　　　C. LUDWIG　　　　2,151,480
AUTOMATIC KNIFE BLADE GRINDING MACHINE
Filed May 14, 1937　　　6 Sheets-Sheet 6

Fig. 16.

Inventor,
Clarence Ludwig
BY W. G. Burns
ATTORNEY.

Patented Mar. 21, 1939

2,151,480

UNITED STATES PATENT OFFICE 2,151,480

AUTOMATIC KNIFE BLADE GRINDING MACHINE

Clarence Ludwig, Bluffton, Ind.

Application May 14, 1937, Serial No. 142,553

5 Claims. (Cl. 51—72)

This invention relates to improvements in automatically operating machines for grinding and regrinding knife blades that have a serrated edge, or of the type used generally in bread slicing machines.

An object of the invention is to provide a machine that is automatic in operation and which has adjustable means associated with its various parts so that in grinding a blade a serrated sharp edge is formed with uniform and accurately spaced crests.

Another object of the invention is to provide in an automatic knife blade grinding machine movable supporting means arranged so that a knife having a serrated edge is moved in contact with a grindstone and progressed regularly so that the grinding action of the grindstone upon the blade follows uniformly along the serrated edge of the blade throughout the length thereof. This object includes also adjusting means so arranged as to regulate the stroke of the blade-feeding apparatus to conform accurately with the spacing of the serrations of the blade, this being highly desirable especially in regrinding or resharpening serrated knife blades.

A further object is to provide a mechanism for advancing a knife blade while contacting a grindstone in a sequence of uniform progressive movements and for oscillating said blade in an arcuate course synchronically with said progressive movements to thereby dress the blade along its serrated edge to an even bevel.

Other objects and advantages of the invention are shown in the following description.

An illustrative embodiment of the invention is shown in the accompanying drawings, in which:

Fig. 11 is a detail view showing a side elevation of one of the magnetically-operated valves used in the apparatus, portions being broken away;

Fig. 12 is a detail plan view of an air pressure-operated switch for controlling electric circuits used in the appliance;

Fig. 13 is a top plan view of one of the electromagnets used in the appliance;

In the illustrative embodiment of the invention there is shown a machine frame constituted of side members 1, end members 2 and legs 3 connected to the side and end members for elevated support of said members.

In the frame is mounted a platform which has adjustable movement relative thereto. The platform is constituted of parallel bars 4 suitably spaced apart, the ends of which extend through the end members 2 of the frame and are longitudinally movable therein. The extending forward ends of the bars 4 are connected by a crossbar 5 upon which is mounted an oscillator 6, hereinafter described, and are also connected by a transversely disposed bracket 7 preferably located at a point spaced back from the forward frame member 2. Upon the top of the bracket 7 is a forwardly extending brace 8 that is connected with the oscillator 6 and affords supplemental support therefor.

The bars 4 have secured thereto a transversely disposed plate 9 upon which is mounted a series of electro-magnetically controlled air-valves 10, 11, 12 and 13, hereinafter described.

Upon the rear portions of the bars 4 within the frame are secured collars 14, and compression springs 15 are disposed concentrically upon said bars between the collars 14 and the rear end frame member 2. A cross-beam 16 is disposed on the bars 4, said bars extending through the corresponding ends of the beam, and said beam bears against said collars 14 in opposition to the resistance of the springs 15. An adjusting shaft 17 extends through the rear frame member 2 and has threaded relation with the beam 16. The rear extending end of the shaft 17 has secured thereon a gear 18 that has engagement with a pinion 19 on a shaft 20 which is mounted in a frame member 20'. An operating rod 21 is connected with the shaft 20 by means of a universal coupling 22. The forward end of the operating rod 21 extends loosely through one of the foremost legs 3 and is provided with a hand-wheel 23. Upon turning of the hand-wheel the shaft 17 is accordingly turned whereupon the platform is moved backwardly in opposition to the springs 15 or is permitted to move forwardly by reaction of said springs according to the direction of the turning movement of the shaft 17. In this manner the platform is adjusted longitudinally with respect to the frame. A safety guard 24 is positioned on the back of the frame and encompasses the gear 18 and pinion 19.

*Knife blade holder*

A swing-head 25 is secured upon the stem 26 of the oscillator 6, and has on its outer end a face-plate 27. Vertical guide rods 28 are positioned respectively adjacent the ends of the face-plate in lugs 29 secured on said plate and have vertical sliding movement in said blocks, and upon each guide rod is secured a block 30 that has vertical movement therewith. In the blocks 30 is mounted a horizontal shaft 31 that has axial sliding movement therein, and an adjusting sleeve-nut 32 threaded on said shaft limits the stroke of the shaft in one direction by coming into contact with the adjacent block 30. Thus, the operator, by turning the nut 32 is enabled to initially set the shaft at a definite selected position.

Upon each end of the horizontal shaft 31 is secured a vertical arm 33 and 34 respectively and upon the lower ends of said arms is secured a transversely disposed iron bar 35. Also, upon the lower ends of the guide rods 28 are secured blocks 36 upon the outer faces of which the bar 35 has longitudinal sliding movement. The blocks 36 are connected by a transverse bar 37 the ends of which are secured respectively to the bottoms of the blocks 36.

The blocks 30, shaft 31, arms 33 and 34 and the bar 35 together with the blocks 36, transverse bar 37, and the guide-rods 28 constitute a traverse unit that has supported relation with the swing-head and has lateral traverse and vertical movement relative thereto.

A bracket 38 is secured to the face-plate 27 at the lower end thereof and is provided with an adjusting screw 39 upon which rests the traverse unit. By turning the screw 39 the traverse unit is adjustably raised or lowered relative to the face-plate 27.

A horizontal shaft 40 is mounted with its ends extending respectively in the blocks 30, and on said shaft between said blocks is secured a hanger 41 having attached to its lower end an electro-magnet 42, the poles of which are positioned immediately adjacent the front face of the transverse bar 35 so that when the magnet is energized the bar is engaged thereby.

Upon one of the blocks 30 is mounted an air cylinder 43 one end of which is closed to provide a piston chamber, and an air supply pipe 44 has communication with said chamber through its closed end. One end of the shaft 40, to which the hanger 41 is secured, extends into the piston chamber and has secured thereon within the chamber a piston 45.

Upon entrance of air under pressure into the chamber movement is imparted to the piston and the shaft 40 attached thereto, whereupon, the hanger 41 is moved accordingly. A compression spring 46 is concentrically disposed upon the shaft 40 and acts against the piston 45 so that upon release of air from the piston chamber the hanger is returned to its initial position by action of the spring. An adjustable stop 47 on the hanger 41 is provided to limit the stroke thereof upon coming against an electric contactor 47' on the adjacent block 30. By adjustably turning the stop 47 the length of the stroke of the hanger is varied accordingly. When the electro-magnet 42 is energized and the transverse bar 35 is engaged thereby and air is simultaneously admitted to the piston chamber, the traverse unit is progressed a definite distance.

Upon the upper part of the face-plate 27 are secured lugs 48 spaced apart, in which is disposed a shaft 49 upon which is secured a tilting block 50 having secured upon its outer end an air cylinder 51, one end of which is closed to provide a piston chamber, and an air supply pipe 52 has communication with said chamber through its closed end. The block 50 has a pendent lug 53 through which loosely extends a screw 54 that is mounted in the face-plate 27, there being provided a compression spring 55 between said lug and face-plate which yieldingly supports the air cylinder 51 normally in its uppermost position.

In the tilting block 50 are disposed spring-restrained plunger pins 56 that are moved longitudinally by action of a piston 57 in the air cylinder 51 upon entrance of air under pressure into the piston chamber. Upon the outer end of each plunger pin is secured a butt-head 58 disposed opposite the inner face of a guard-plate 59 supported in connection with the tilting block so that when a knife blade 60 is positioned between the butt-heads and the guard-plate, and air under pressure is introduced into the piston chamber, the plunger pins are thrust forwardly and the knife blade is clamped against the guard-plate. Thus, when the knife-blade is clamped in place and the traverse unit is simultaneously progressed, the knife blade is moved accordingly. The upper extending end of one of the arms 33 has adjustably secured therein a horizontally disposed blade-attaching rod 61 having at one end a pin 62 adapted to have connection with the knife blade 60, there being holes 64 adjacent the ends of the knife blade for the reception of the pin. Also, on the rod is disposed a spring-pressed sleeve 65 that bears against the adjacent end of the knife blade when connected with the rod, so that the blade is secured in a definite position relative to the rod.

*Oscillator*

The swing-head 25 is actuated by the oscillator 6 which consists of a hollow base 66 that is secured on the cross-bar 5, an oscillating member 67, a head 68 for confining said member in the base and a bonnet 69 threaded on the base to hold the head in place. The axial stem 26 on the oscillating member extends through the bonnet, and packings 71 and 72 are provided to prevent leakage from the bonnet. The base and bonnet have threaded relation so that upon turning the bonnet upon the base the packing 71 is compressed, and a ring 73 threaded on the base is provided for compressing the packing 72.

The base 66 has therein oppositely disposed vanes 74—74' so that two separate semi-circular chambers 75—75' are provided, and the oscillating member has oppositely disposed vanes 76—76' that extend respectively into said chambers and have movement therein between the corresponding vanes. Each vane has therein a port 77—77' for ingress and egress of fluid with respect to the chamber 75', and the hub of the oscillating member has made therein ducts 78—78' through which liquid, admitted through one of said ports, flows into or from said chambers according to the movement of fluid through said ports. For instance, as fluid enters the base through port 77 the flow continues through the duct 78 and consequently the vanes 76' and 76 are moved clockwise because of the pressure of liquid in the chambers. Coincidentally, outflow of fluid through duct 78' and 77' takes place. When, however, fluid under pressure enters through port 77' and passes through duct 78', the oscillating member is thereupon moved counter-clockwise, and concurrently, outflow of fluid from said chambers through duct 78 and port 77 takes place. Upon operation of the oscillating member the swing-head 25 is actuated.

The oscillator 6, preferably, is motivated by liquid supplied under control of electro-magnet operated air valves 10 and 12. For this purpose there are provided two reservoirs 79 and 80 that have pipe connections 79' and 80' respectively with the ports 77 and 77' in the oscillator. Said pipe connections each have a hand-operated valve 81 by which flow of liquid through the corresponding pipe connections is regulated. The reservoirs are filled with liquid, preferably oil, and have means in connection therewith, hereinafter described, by which momentary pressure is applied alternately thereto. By adjustably turning the valves 81 the speed of the oscillator is regulated.

*Controlling unit*

Figure 1:
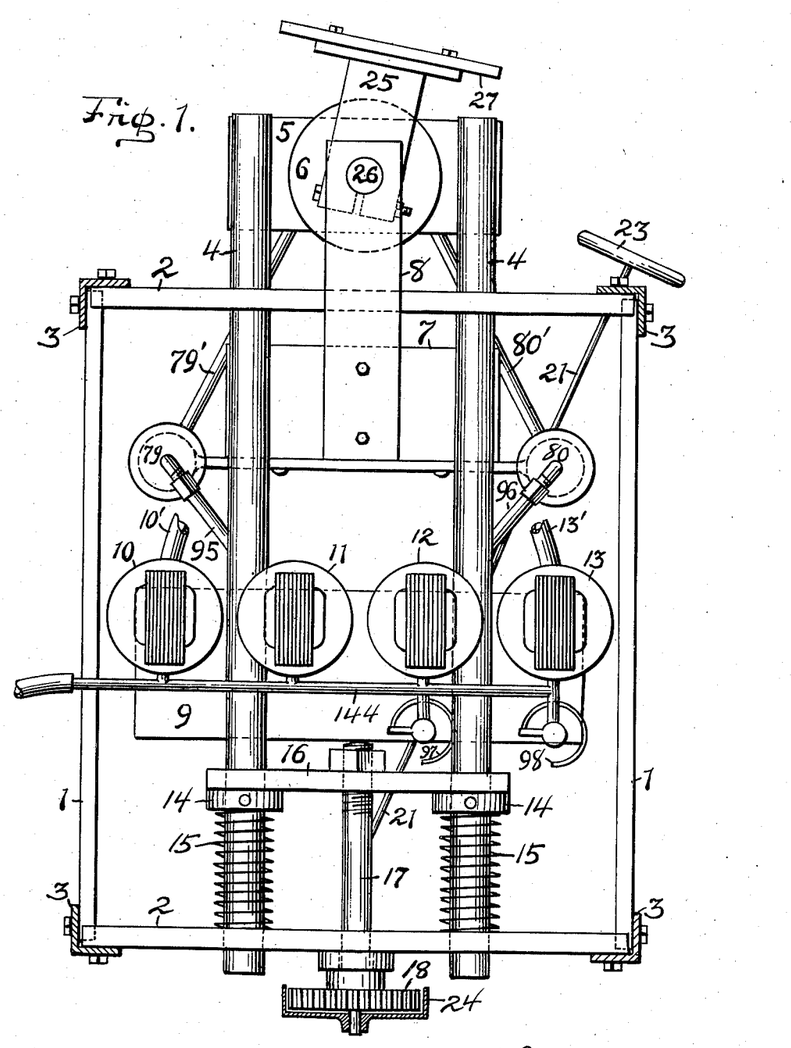
Fig. 1 is a top plan view of the frame and certain of the movable members of the machine, parts being in section.
Figure 2:
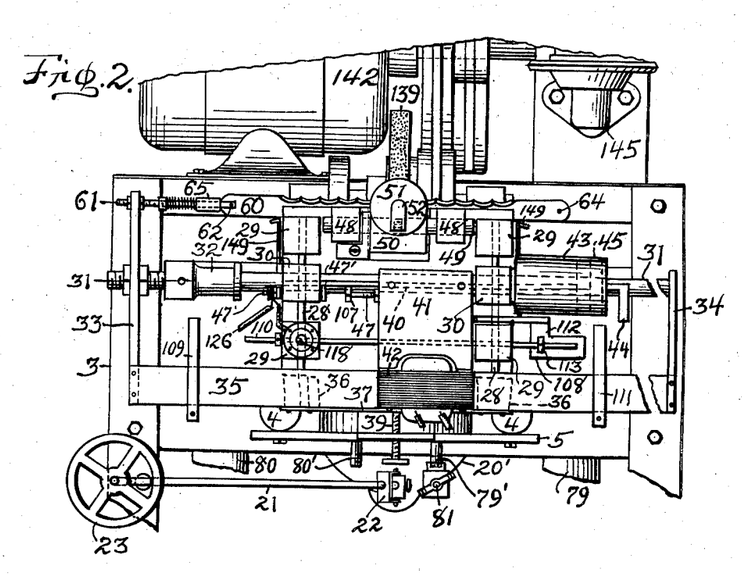
Fig. 2 is a fragmentary front elevation of the machine.
Figure 3:
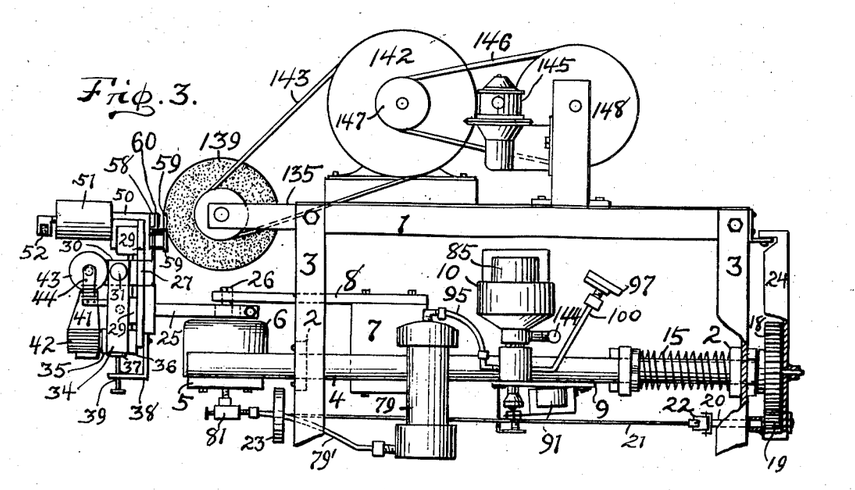
Fig. 3 is a fragmentary side elevation of the machine, parts thereof being shown in section.
Figure 4:
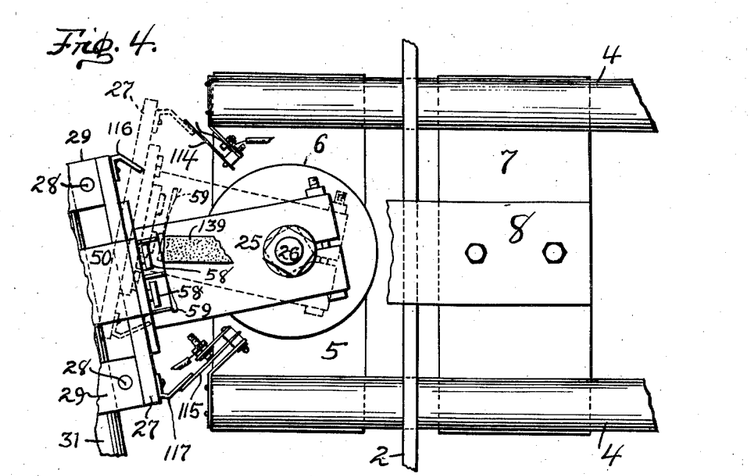
Fig. 4 is a fragmentary plan view of a knife blade holder and oscillating means therefor, parts being broken away.
Figures 5, 6, 7, 8:
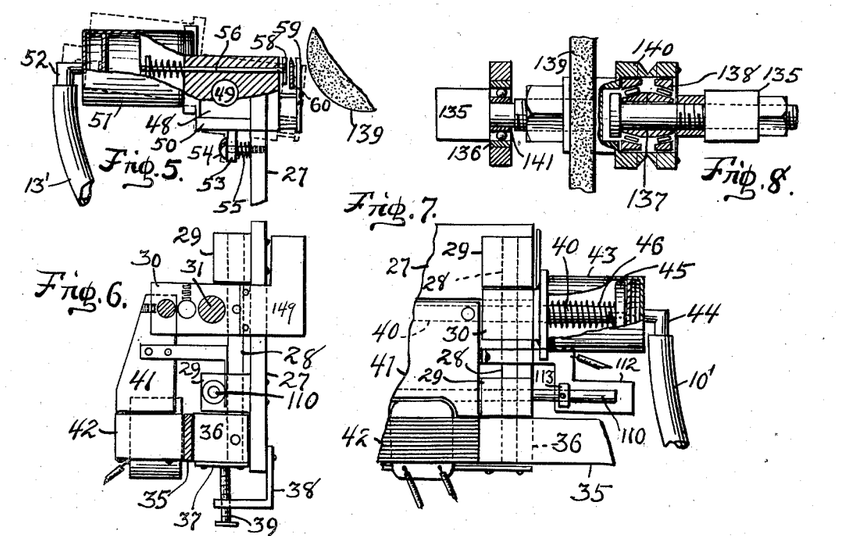
Fig. 5 is a detail view of the knife blade holder showing the gripping means therefor, portions being shown in section.
Fig. 6 is a detail view showing a side elevation of the feeding mechanism for the knife blade holder, parts being in section.
Fig. 7 is a detail front elevation of the feeding mechanism for the knife blade holder.
Fig. 8 is a detail view, partly in section, showing the mounting for the grindstone.
Figures 9, 10:
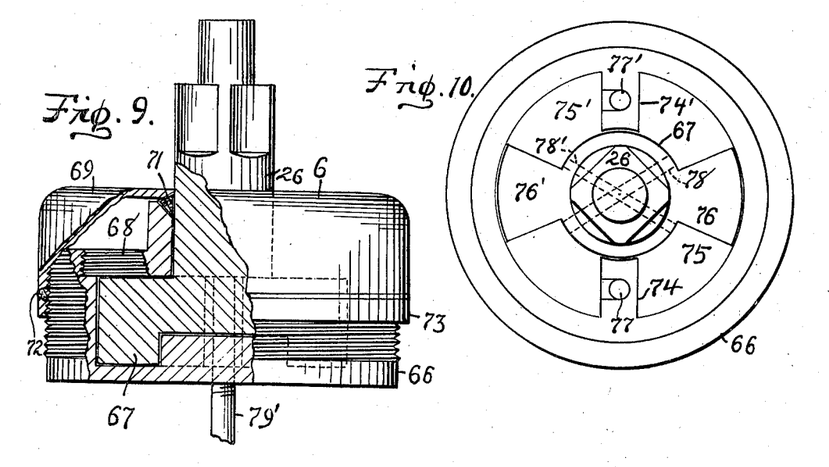
Fig. 9 is an elevation, partially broken away and in section, showing a hydraulic oscillator for actuating the knife blade holder.
Fig. 10 is a plan view of a part of the oscillator.
Figures 11, 12, 13:
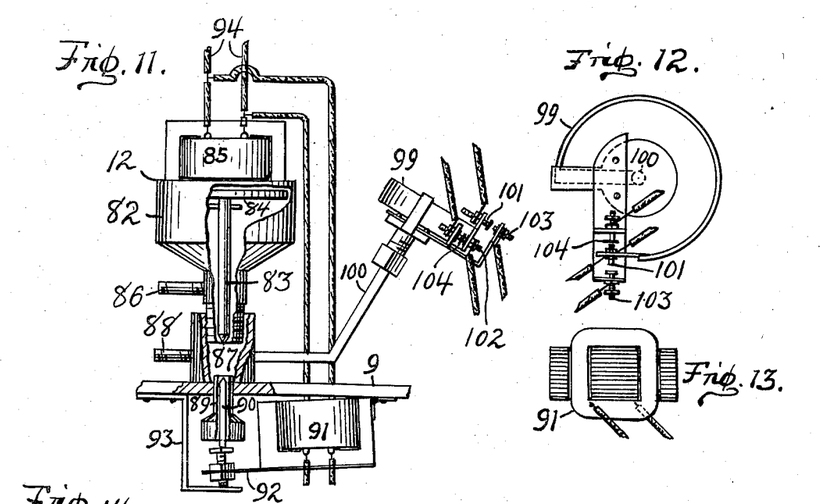
Figure 14:
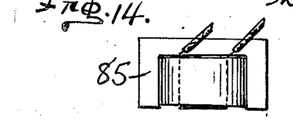
Fig. 14 is a side view of the electro-magnet.
Figure 15:
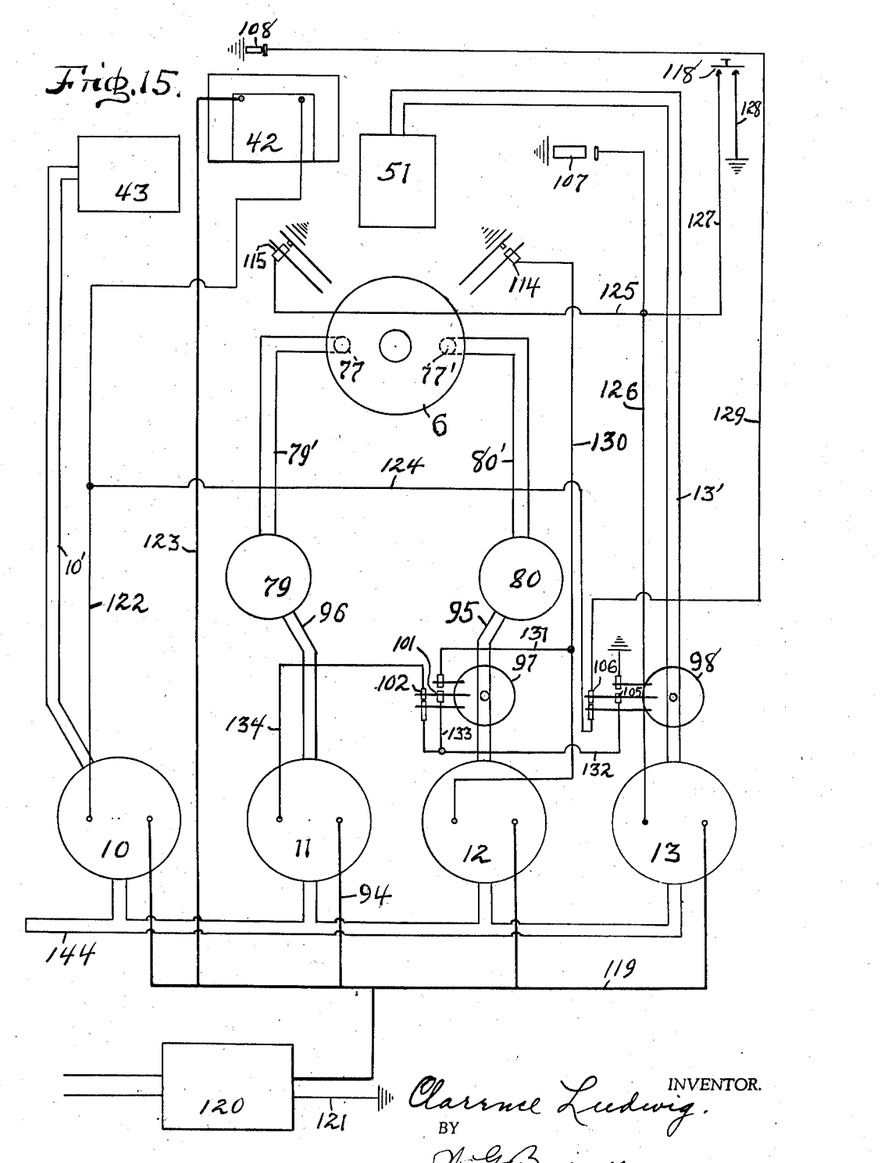
Fig. 15 is a diagram of the electrical, pneumatic and hydraulic arrangement of the connections with the parts associated therewith.
Figure 16:
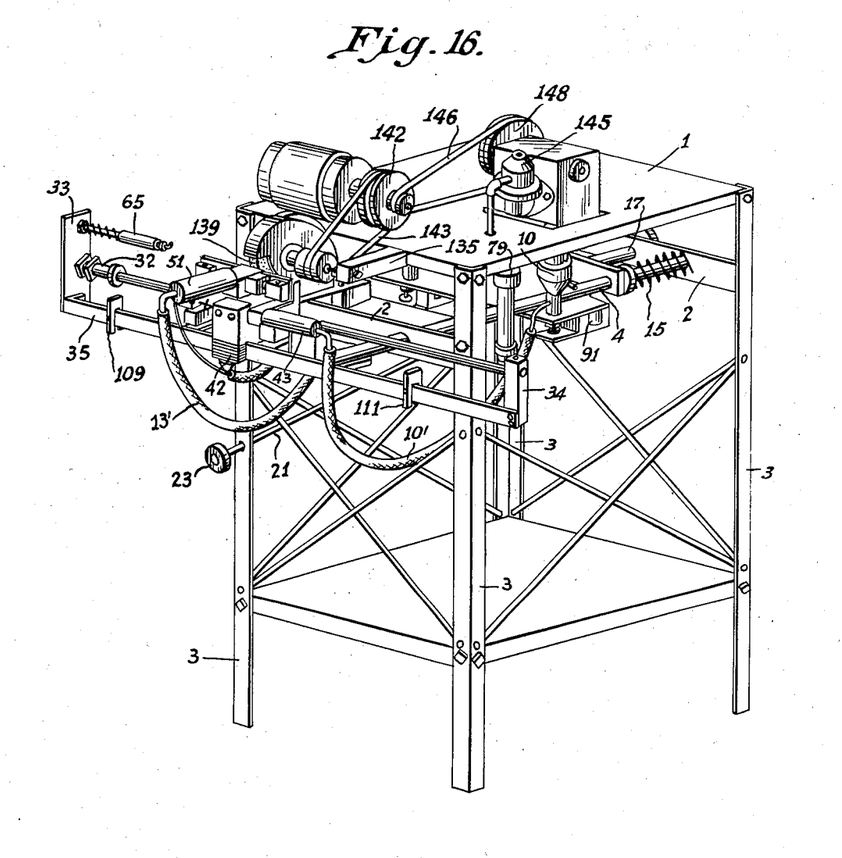
Fig. 16 is a perspective view of the machine.

The apparatus for automatically controlling operation of the swing-head and traverse unit is constituted of the series of electro-magnetically operated air valves 10, 11, 12 and 13 and the switch-controlled circuits hereinafter described. Each of said switches, preferably, (Fig. 11) has an air receiving chamber 82 that is closed at its lower end by a needle valve 83, the upper end of which has thereon an iron disc 84 that is attracted by an electro-magnet 85 when the magnet is energized. The magnet is located on the closed top of the receiving chamber 82. Air under pressure is supplied from a suitable source to the air chamber through an inlet pipe 86 and the lower end of the chamber is threaded in the upper end of a hollow base 87 that is provided with an outlet pipe 88. The lower end of the base has an exhaust pipe 89 provided with a needle valve 90 that is closed by action of another electro-magnet 91. The magnet 91 is hinged to the bottom of the iron plate 9 and has a laterally extending arm 92 connected with the needle valve 90 so that when the magnet 91 is energized it is swung up against the iron plate by magnetic attraction causing the needle valve 90 to close. A bracket 93 secured to the plate is arranged to limit opening movement of said needle valve and swinging movement of the magnet. The magnets 85 and 91 are connected in parallel with conductors 94 so that said magnets are simultaneously energized. Thus, when the air valve 83 is raised to open position, the exhaust valve 90 is simultaneously closed, and when said magnets are de-energized the valve 83 is closed and the exhaust valve 90 is opened.

The outlet pipe 88, connected with the hollow base 87 of the valve 12, has communication with the upper end of the reservoir 80 through a connection 95, and the hollow base of the valve 11 has similar communication with the reservoir 79 through a connection 96. Thus, upon alternate operation of the valves 12 and 11, air pressure is accordingly applied to said reservoirs which causes the liquid in said reservoirs to flow to and from the oscillator, thus actuating same.

The outlet pipes 88 of the air valves 10 and 13 have communications respectively through tubes 10' and 13' with the air cylinders 43 and 51 so that upon operation of said air valves the pistons in said air cylinders are actuated.

*Pressure switches*

The hollow bases 87 of the air valves 11 and 12 have connected therewith corresponding air pressure operated electric switches 97 and 98 respectively that are operated pneumatically when air pressure is raised in the corresponding valve bases 87.

Each pressure switch (Figs. 11 and 12) consists of a supported arcuate tube 99 that is connected at its supported end with the corresponding valve base 87 by means of a pipe 100, and the free end of said tube has switch members 101 and 102 that are operatively associated with adjacently positioned contactors 103 and 104 respectively. Normally, the switch member 102 and contactor 104 are closed and the switch member 101 and contactor 103 are open. When air pressure is raised in the corresponding valve base, the arcuate tube becomes thereby distended so that switch member 102 is moved to open position and switch member 101 is closed.

With respect to the pneumatically-operated switch 98 the switch members are indicated by 105 and 106 respectively, the same being comparable with the switch members 101 and 102 respecting the pneumatic switch 97.

There are provided on the traverse unit automatically-operated switches 107 and 108. The switch 107 normally is open and is closed when contacted by the stop 47 upon completion of each forward stroke of the traverse unit. The switch 108 normally is closed by movement of the traverse unit to its initial starting position when an arm 109 on the traverse bar 35 contacts with and moves a sliding rod 110 that is mounted in the blocks 29, whereupon the switch 108 is closed. Upon completion of the left-hand movement of the traverse bar 35 an arm 111 contacts with and moves the rod 110 in the opposite direction thereby opening the switch 108 which is constituted of a spring-plate 112 attached to the hanger 41 and a contactor 113 on the rod 110.

There are provided automatically-operated control switches 114 and 115 associated with the platform and the face-plate on the swing-head 25. Upon completion of the left-hand movement of the swing-head, the switch 114 is closed, and upon completion of the right-hand movement of the swing-head the switch 115 is opened.

These actions are occasioned by engaging brackets 116 and 117 secured respectively on the opposite ends of the face-plate 27.

There is also provided a manually-operated starting switch 118, closing of which causes the electro-magnetically controlled switch 113 to open and consequent initial action of the oscillator 6.

The magnet coils on the air valves 10, 11, 12 and 13 each have connection with a bus-wire 119 that is connected with a rectifier 120 through which electric current is supplied to the apparatus. The rectifier also has a ground connection 121.

Electrical connections are established between the various switches, the electro-magnet 42 and the electro-magnets on the air valves 10, 11, 12 and 13 by conductors suitably arranged. Viz: The traverse unit moving magnet 42 and the electro-magnet for the air valve 10 are connected in parallel by conductors 122 and 123, and the conductor 122 is connected with the switch 106 by a conductor 124 so that when the switch 106 is closed the magnet 42 and valve 10 function and consequently the traverse unit is progressed through the medium of the air actuated piston 45.

The switch 115 normally is open and has connection with the air valve 13 through conductors 125 and 126, and the manually-operated switch 118 also has connection with the air valve 13 through conductors 127 and 126, said switch being grounded by a connection 128.

The switch 108, by conductors 129 and 124 and switch 106, when closed, completes the electrical circuit through the magnet coils on the air valve 10 and on the magnet 42 that engages the traverse unit.

The magnet coil on the valve 12 has connection with the switch 114 through conductor 130, and the air pressure controlled switch 101 also has connection with said air valve magnet coil 12 through a conductor 131. The switches 101, 102, and 105 are connected by conductors 132 and 133, and the switch member 102 has connection with the coil of the electro-magnetically-operated air valve 11 through a conductor 134.

*Grinding element*

Upon the main frame are positioned forwardly extending beams 135, one of which supports a ball bearing 136 and the other being provided with a stub-shaft 137 axially alined with said bearing, and upon said stub-shaft preferably is mounted a roller bearing 138. A grinding element, consisting of a grindstone 139, is mounted upon a fixture constituted of a pulley 140 that is supported on said roller bearing, and a stud 141 that is supported in said ball bearing.

Rotary movement is imparted to the grindstone 139 by means of a motor 142 through the medium of a belt 143. The cutting edge of the grindstone is initially positioned immediately back of the guard-plate 59 and has grinding action on the blade 60 when said blade is pressed into place against said guard-plate and the swing-head is in motion.

The inlet pipes 86 of the air valves 10, 11, 12 and 13 have connection with a supply pipe 144 through which air is supplied thereto under pressure from a suitable source. For convenience, there is provided an air compressor 145 in juxtaposition with the motor 142 arranged to be actuated by a belt 146 and pulleys 147 and 148 operatively connected respectively with the motor and compressor.

In connection with the traverse unit preferably attached to the blocks 30, are provided blade-supporting brackets 149 by means of which the blade 60 is sustained in operative position when connected with the blade-attaching rod 61.

*Operation*

In operation, the traverse unit is first moved right-handedly until stopped by contact of the sleeve 32 with the adjacent block 30. The knife blade 60 then is connected with the rod 61 and secured thereon by the spring-pressed sleeve 65. The back of the blade rests upon and is supported by the brackets 149 while disposed between the butt-heads 58 and the guard-plate 59. The operator then by closing the switch 118 causes action of the electro-magnetically-operated valve 13, whereupon air enters the air cylinder 51, causing movement of the plunger pins and clamping action of the butt-heads against the blade thereby holding the blade against the guard-plate.

Upon operation of the valve 13 the air pressure switch 98 is actuated, whereupon the switch 105 is closed which affords a ground connection through closed switch 102 with the electro-magnetically-operated air valve 11, thus admitting air pressure into the reservoir 79 and consequent movement of the oscillator 6 in one direction. Thus, the swing-head is actuated permitting the switch 115 to close, and upon completion of the stroke of the swing-head the switch 114 is closed, whereupon the electro-magnetically-operated air valve 12 is actuated, thus admitting air under pressure into the reservoir 80 and consequent movement of the oscillator and swing-head in the opposite direction, and concurrent opening of the switch 114. During operation of the air valve 12 the pressure switch 97 is actuated causing switch 102 to open and thus release the air valve 11 which permits return of liquid from the oscillator 6 back into the reservoir 79. Also, the air valve 12 is momentarily maintained in operation through action of the pressure valve 97 which causes closing of the switch 101, whereupon the circuit through valve 12 is completed by grounding through closed switch 105. When the swing-head engages the switch 115 said switch is opened causing release of the valve 13, whereupon by action of the pressure valve 98 the switch 105 is opened and consequently the air valve 12 is released which permits the switch 102 again to close. Thus, the air valves 10 and 12 are operated alternately causing continuous action of the oscillator and swing-head attached thereto.

When the traverse frame is initially moved to starting position, as above described, the arm 109 on the traverse bar 35 engages and moves the sliding rod 110 which causes the switch 108 to close by engagement of the contactor 113 with the spring-plate 112, and thus is established current through closed switch 106 thereby energizing the electro-magnet 42 and the air valve 10 simultaneously. The electro-magnet 42 engages the traverse bar 35 and the air valve 10 admits air under pressure to the cylinder 43 and consequent movement of the piston 45. In this manner the traverse unit is moved to an extent limited by closing of the switch 107 which causes operation of the air valve 13 and consequent admission of air into the cylinder 51, thus causing the blade 60 to be pressed against the guard-plate. By operation of the air valve 10 and magnet 42, the traverse unit is progressed left-handedly in a sequence of movements equal in extent until the traverse unit reaches the point where the arm 111 on the traverse bar engages the sliding rod 110 and causes opening of the switch 108, which action terminates the operation of the machine.

During the left-hand travel of the traverse unit the upper edge of the knife blade 60 is subjected to the action of the grindstone at spaced intervals on the side thereof adjacent the grindstone. After the machine is stopped, by opening of the switch 108, the blade is disconnected by the operator and turned end for end and again connected to the blade-attaching rod 61. The traverse unit is then again manually replaced in its starting position which causes closing of the switch 108.

The operation of the machine is re-started by closing the manually-operated switch 118. By operating the machine in the manner set forth the knife blade is ground upon one edge that present a series of equally spaced uniform crests between which the blade is beveled to a sharp edge.

The illustrative embodiment of the invention is exemplary and is subject to variations in structure and arrangements of parts, which would still accomplish the same end, by exercise of engineering skill, without departing from the spirit of the invention. Therefore, the claims are intended to encompass such variations in structure and rearrangement of parts.

What I claim is:

1. A knife blade grinder, consisting of a supporting frame having thereon a motor-driven grindstone and an adjustable platform including means for adjusting same, an oscillator mounted on the platform having secured thereto a swing-head, a traverse unit operatively associated with said swing-head provided with a knife blade holding means and a guard-plate disposed between said grindstone and blade, an air pressure actuated member adapted periodically to press said blade against said guard-plate, an electro-magnet engageable with said traverse unit, another air pressure actuated member for moving said traverse unit simultaneously with the action of said electro-magnet, electro-magnetically operated air valves for supplying air under pressure to said air pressure actuated members, liquid-containing reservoirs having connections with said oscillator connected respectively with the opposite ports thereof, other electro-magnetically-operated air valves having connections respectively with said reservoirs arranged to supply air under pressure to said reservoirs alternately, air pressure operated switches connected respectively with one of the first-mentioned air valves and with one of said other air valves, switches operatively associated with the swing-head having controlling connections with the last-mentioned air valves, electrical connections actuated by said air pressure switches between said electro-magnetically operated air valves controlled by said air pressure switches, automatically-operated switches associated with the traverse unit through which movement thereof is controlled, and a manually operated switch connected with one of the electro-magnetically controlled air valves for starting operation of the machine.

2. In a knife blade grinding machine, a supported grindstone having actuating means therefor, an oscillator juxtaposed with respect to said grindstone and having actuating means therefor, a swing-head operatively connected with said oscillator, a traverse unit carried by said swing-head provided with means for imparting thereto sequential movements in one direction synchronically with the action of said swing-head, means on said traverse unit for connecting thereto a knife blade to be ground, supports on said swing-head to sustain said knife blade, and a spring-pressed tilting block on said swing-head provided with a guard-plate disposed adjacent said grindstone and having a periodically operated means for clamping said blades against said guard-plate into position to be ground synchronically with respect to the action of said swing-head.

3. In a knife blade grinding machine, a supported grindstone having actuating means therefor, an oscillator juxtaposed with respect to said grindstone and having actuating means therefor, a swing-head operatively connected with said oscillator, a traverse unit carried by said swing-head having a knife blade attaching member, and provided with means for imparting thereto sequential movements in one direction synchronically with the action of said swing-head, and a spring-pressed tilting block on said swing-head provided with a guard-plate disposed adjacent said grindstone and having a periodically operated means for clamping said blades against said guard-plate into position to be ground synchronically with respect to the action of said swing-head.

4. In knife blade grinding machine, a stationary frame, a platform member adjustably movable on said frame, a power-driven grindstone having supported connection with said frame, an oscillator supported on said platform, a swing-head supported on and actuated by said oscillator, said swing-head having mounted therein a traverse member relatively movable with respect thereto provided with a knife-securing means, a knife-clamping means supported by said swing-head adapted when actuated to grip said blade and hold it in grinding position, automatic means for progressing said traverse member through successive stages of movement relative to said swing-head, and means for actuating the oscillator, knife-clamping means and for controlling said automatic means.

5. A knife blade grinding machine having a supported power-driven grindstone, a swing-head disposed to have arcuate oscillatory movement, a knife blade holding traverse member movably mounted in said swing-head, a knife clamping means supported by said swing-head adapted when actuated to clamp said blade and hold it in grinding position, means for progressing said traverse member through successive stages of movement relative to said swing-head, and means for actuating said swing-head, knife clamping means and said traverse member in timed sequence.

CLARENCE LUDWIG.